United States Patent [19]

Forch

[11] Patent Number: 5,018,749
[45] Date of Patent: May 28, 1991

[54] SLIDE RING SEAL

[75] Inventor: Hans Forch, Birkenau, Fed. Rep. of Germany

[73] Assignee: Firma Carl Freudenberg, Weinheim/Bergstr., Fed. Rep. of Germany

[21] Appl. No.: 376,355

[22] Filed: Jul. 6, 1989

[30] Foreign Application Priority Data

Sep. 1, 1988 [DE] Fed. Rep. of Germany ....... 3829702

[51] Int. Cl.$^5$ ............................................. F16J 15/34
[52] U.S. Cl. ........................................ 277/27; 277/95; 277/173
[58] Field of Search .................. 277/65, 27, 37, 38, 277/95, 58, 25, 142, 143, 81 R, 91, 175, 173; 384/484, 482

[56] References Cited

U.S. PATENT DOCUMENTS

| 3,311,430 | 3/1967 | Christensen et al. | 277/95 X |
|---|---|---|---|
| 3,363,911 | 1/1968 | McKinven, Jr. | 277/65 |
| 3,822,890 | 7/1974 | Bourgeois | 277/65 |
| 4,049,281 | 9/1977 | Bainard | 277/38 |
| 4,196,912 | 4/1980 | Quitberg | 277/81 R |
| 4,210,339 | 7/1980 | Povejsil | 277/95 X |
| 4,251,082 | 2/1981 | Little | 277/95 X |
| 4,331,339 | 5/1982 | Reinsma | 277/95 X |
| 4,508,020 | 4/1985 | Szcupak | 277/27 |
| 4,822,055 | 4/1989 | Hogan | 277/27 |
| 4,858,516 | 8/1989 | Klein | 277/27 X |

FOREIGN PATENT DOCUMENTS

| 321200 | 6/1989 | European Pat. Off. | 277/81 R |
|---|---|---|---|
| 1100410 | 2/1961 | Fed. Rep. of Germany . | |
| 830586 | 12/1938 | France | 277/38 |
| 1438455 | 12/1966 | France | 277/65 |
| 103383 | 12/1941 | Sweden | 277/95 |
| 159000 | 5/1957 | Sweden | 277/81 R |

Primary Examiner—William A. Cuchlinski, Jr.
Assistant Examiner—Scott Cummings
Attorney, Agent, or Firm—Felfe & Lynch

[57] ABSTRACT

A slide ring seal to seal about a shaft with respect to a housing, including a slide ring 4 made of PTFE pressed against a counter surface 3, which is relatively rotatable, by means of pressure P of the medium to be sealed and basically extends in radial direction. The slide ring 4 has a basically rectangularly defined cross-sectional profile having a radially internal or radially external circumference surface 6, 5 basically extending parallel to the axis of the slide ring seal. The slide ring 4 is provided with a sealing edge 7 axially extending beyond the profile of a major portion of the cross section of the slide ring towards the counter surface and formed during manufacture. The sealing edge 7 has a diameter which is basically identical with the diameter of the circumference surface 6 exposed to pressure P of the medium to be sealed and it can be resiliently pressed to be surface planar with the profile of slide ring 4 by means of pressure P.

6 Claims, 3 Drawing Sheets

SLIDE RING SEAL

The invention relates to a slide ring seal.

Such a slide ring seal is disclosed in German patent DE PS 11 00 410. The slide ring rests with a radially expanding slide surface at a counter surface; a constant pressure contact with the counter surface is required so as to avoid the build-up of a counter pressure in the sealing gap. After a relatively short period of service the slide ring showed strong signs of wear on the slide surface which are particularly obvious within a radial distance to the circumferential surface exposed to the pressure of the medium to be sealed.

It is an object of the invention to further develop such a slide ring seal such that there is no axial pressure contact to the counter surface required in pressure-free condition and, as a consequence thereof, to significantly improve the service life while the wear is decreased and heating at the counter surface is reduced.

The slide ring seal in accordance with the invention includes a slide ring having a sealing edge formed during manufacture and extending beyond the profile of the cross section of the major portion of the slide ring in direction towards the counter surface; the sealing edge has a diameter which is basically identical with the diameter of the circumferential surface exposed to the pressure P of the medium to be sealed. The sealing edge can be resiliently pressed against the counter surface to be basically surface planar with the cross-sectional profile of the slide ring by means of pressure P of the medium to be sealed. The specific surface contact pressure to which the sliding surface of the slide ring is exposed under regular operational conditions is reduced within a radial distance to the circumferential surface exposed to the pressure of the medium to be sealed. Even when used to seal gases, the slide ring seal in accordance with the invention has a significantly improved service life.

By means of the pressure of the medium to be sealed, the sealing edge of the slide ring can be resiliently pressed to be surface planar with the cross-sectional profile of the slide ring which is basically rectangular due to manufacture. This ensures that the sealing edge is movable in itself independent from the flexibility of the slide ring and permits compensating for irregularities in the surfaces which are in contact with each other. Local overstress is then avoided. The condition in which the sealing lip is resiliently pressed to be surface planar with the cross-sectional profile of the slide ring which is basically rectangular can correspond to the regular operating condition.

To improve the flexibility of the sealing edge it proved to be advantageous that, during manufacture, the slide ring be provided with a recess on the side axially facing away from the sealing edge. This can be achieved in a particularly simple manner by providing a chamfering at the profile defining the slide ring. It is advantageous that this chamfering extend radially and/or axially while basically conforming with the sealing edge. Due to manufacture, it can basically extend parallel to the surface of the truncated cone defining the axially projecting cross-sectional profile of the sealing edge on the axially opposing side of the slide ring. With pressure P of the medium to be sealed increasing, the sealing edge can be resiliently pressed to be surface planar with the slide ring particularly uniformly in this case which proved to be advantageous with regard to obtaining an especially good service life.

Depending on the actual embodiment, the sealing edge can be disposed on the radially internal or radially external circumferential surface of the slide ring. Disposed on the internal circumferential surface, the circumference speed is comparatively low with regard to the counter surface which is advantageous to achieving a particularly good service life.

In order to permit an automatic readjusting of the slide ring towards the counter surface if wear occurs, it is necessary not only to support the slide ring such that it cannot rotate but also to permit an axial moving in the housing to be sealed about. To meet this purpose, it is possible to connect the slide ring with the housing by means of a bellows-type connection. With regard to mounting and manufacturing it is proved to be advantageous if the slide ring is attached to a support ring and if a sealing lip made of rubber-elastic material is attached to the support ring and if the sealing lip is pressed onto a cylinder surface under elastic prestress. In an embodiment with the sealing edge provided at the internal circumferential surface of the slide ring the diameter of the cylinder surface is larger than the diameter of said circumferential surface; in an embodiment with the sealing edge provided at the external circumferential surface of the slide ring the diameter of the cylinder surface is smaller than the diameter of said circumferential surface. This ensures that pressure P of the medium to be sealed causes a constant pressure contact of the sealing edge with the counter surface. The difference between the respective diameter of the cylinder surface and the diameter of the sealing edge, however, can be calculated to be so small that under regular operating conditions the effective, specific surface pressure contact at the sealing edge is very low. Even with very large diameters of the sealing edges and high pressures of the medium to be sealed an outstanding service life can be achieved when an excellent sealing is ensured. If the pressure stress is reduced it can be sufficient if the diameter of the cylinder surface within the adjustment referred thereto is calculated such that, under regular operating conditions, the sealing edge is only to a certain percentage resiliently pressed into the profile of the slide ring. Even if this condition is maintained for a very long period, the resilient pressing remains a constant value insofar that the slide ring basically consists of PTFE, a material which exhibits a high consistency with regard to relaxation. When the pressure contact decreases the slide ring always resumes the form given when manufactured.

In order to achieve good sealing it is necessary that a continuous contact with the counter surfaces, which under regular operating conditions are subject to axial relative dislocation, be also ensured; with respect to this it proved to be advantageous if the slide ring be elastically pressed against the counter surface and if at least one pressure spring is provided for this pressure contact. If necessary, this spring can be configured as a cup spring and completely surround the sealing axle. However, it is also possible to use several pressure springs and distribute the springs evenly in the direction of the circumference.

The pressure spring is advantageously disposed between the support ring and the housing. It can be attached on both sides so as to basically connect in a non-rotatable way the parts mutually spring-supported by it in axial direction.

In accordance with the invention, a slide ring seal to seal about a shaft with respect to a housing, comprises a slide ring made of PTFE pressed against a counter surface which is relatively movable, by means of pressure of a medium to be sealed, and basically extending in a radial direction. The slide ring has a cross-sectional profile having a radially external peripheral surface basically extending parallel to the axis of the slide ring. The slide ring has a sealing edge axially extending beyond the profile of the cross section of the major portion of the slide ring. towards the counter surface and formed during manufacture. The sealing edge has a diameter which is basically identical with the outer diameter of a circumferential surface portion exposed to pressure of the medium to be sealed and the sealing edge is. resiliently pressable to be basically surface planar with the profile of the cross section of the major portion of the slide ring by means of pressure.

For a better understanding of the invention, together with other and further objects thereof, reference is made to the following description, taken in connection with the accompanying drawings, and its scope will be pointed out in the appended claims.

Referring now to the drawings.

Figure 1:
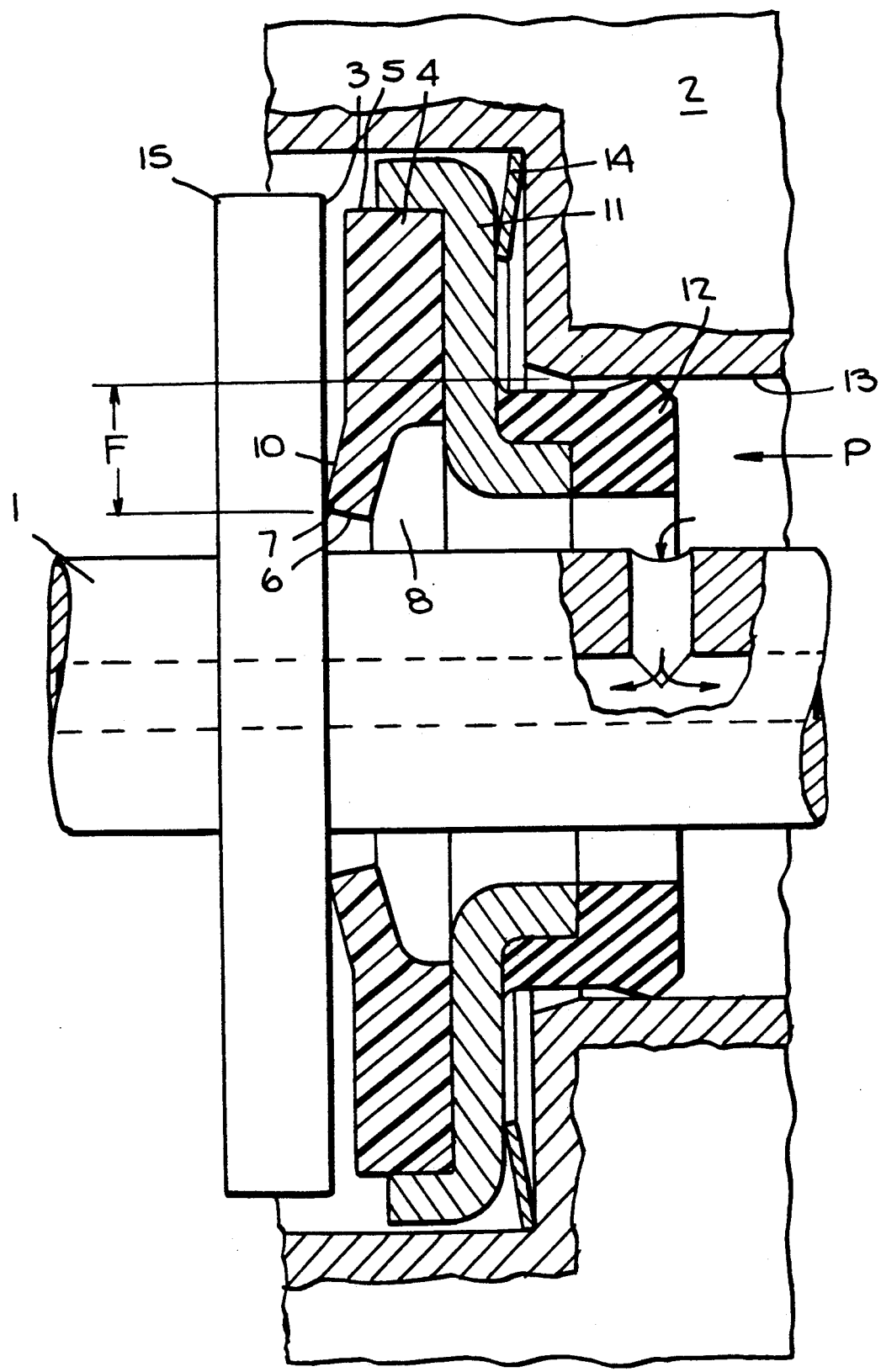
FIG. 1 is a half sectional view of a slide ring seal with the sealing edge provided at the internal circumferential surface of the slide ring.

Both Figs. show the represented slide ring seals built in without pressure and to be used to seal a housing 2 with respect to a shaft 1.

Shaft 1 is provided with an counter ring 15, respectively, the front surface of which assumes the function of a counter surface 3 for the slide ring 4. The latter is connected with a support ring 11, respectively, preferably made of deep-drawn sheet steel, by gluing together, for example. Support ring 11 preferably has a Z-shaped profile to which a lip ring 12 preferably made of rubber is attached by means of vulcanization and said lip ring 12 is located at the end axially opposing slide ring 4 preferably made of PTFE. The lip ring 12 is provided with a sealing edge which contacts the cylinder surface 13 of housing 2 under a radially directed prestress and thus sealing it. Due to the low friction coefficient of the slide ring 4 made of PTFE with respect to the lip ring 12 made of rubber, a non-rotatable association with the housing is ensured under regular operating conditions by reducing an additional protection against torsion. In any case, the slide ring 4 preferably has a rectangularly defined profile.

In the embodiment according to FIG. 1 the slide ring is provided with a sealing edge 7 at the radially internal circumferential surface 6 which faces the counter surface 3 and, due to manufacture, extends beyond the preferably basically rectangularly defined cross-sectional profile in axial direction. Further, on the side axially opposing the sealing edge 7 the slide ring 4 is provided with a recess 8 into the profile. The recess is defined by a truncated cone surface ending in a radius. The truncated cone surface extends parallel to the truncated cone surface 10 The diameter of the cylinder surface 13 is slightly larger than the diameter of the sealing edge 7. The difference surface having the radial extension F which can be determined between the two (surface 13 and sealing edge 7) describes the hydraulically effective surface which is available to pressure P of the medium to be sealed in order to press the sealing edge 7 to the counter surface 3. Without problems, it can be determined to be so small that, under regular operating conditions, the resilient pressing is carried out only partially in the basically rectangularly defined cross-sectional profile or slide ring 4, i.e. in the radial plane of the remaining boundary surface of slide ring 4 opposite the counter ring. The recess 8 on the side of slide ring 4 which is axially opposing the sealing edge 7 supports the resilient pressing and ensures that a good service life be achieved.

In order to also achieve good sealing in cases when there are axial relative dislocations of the counter surface, a spring 14 is provided which is disposed in the axial gap between support ring 11 and housing 2. This also ensures a tight contact between sealing edge 7 and counter surface 3 in such cases.

The sealing exhibits good emergency running properties. It is particularly suitable for a lossfree feeding of a gas-like medium which is in the housing into the borehole of a shaft 1.

Figure 2:
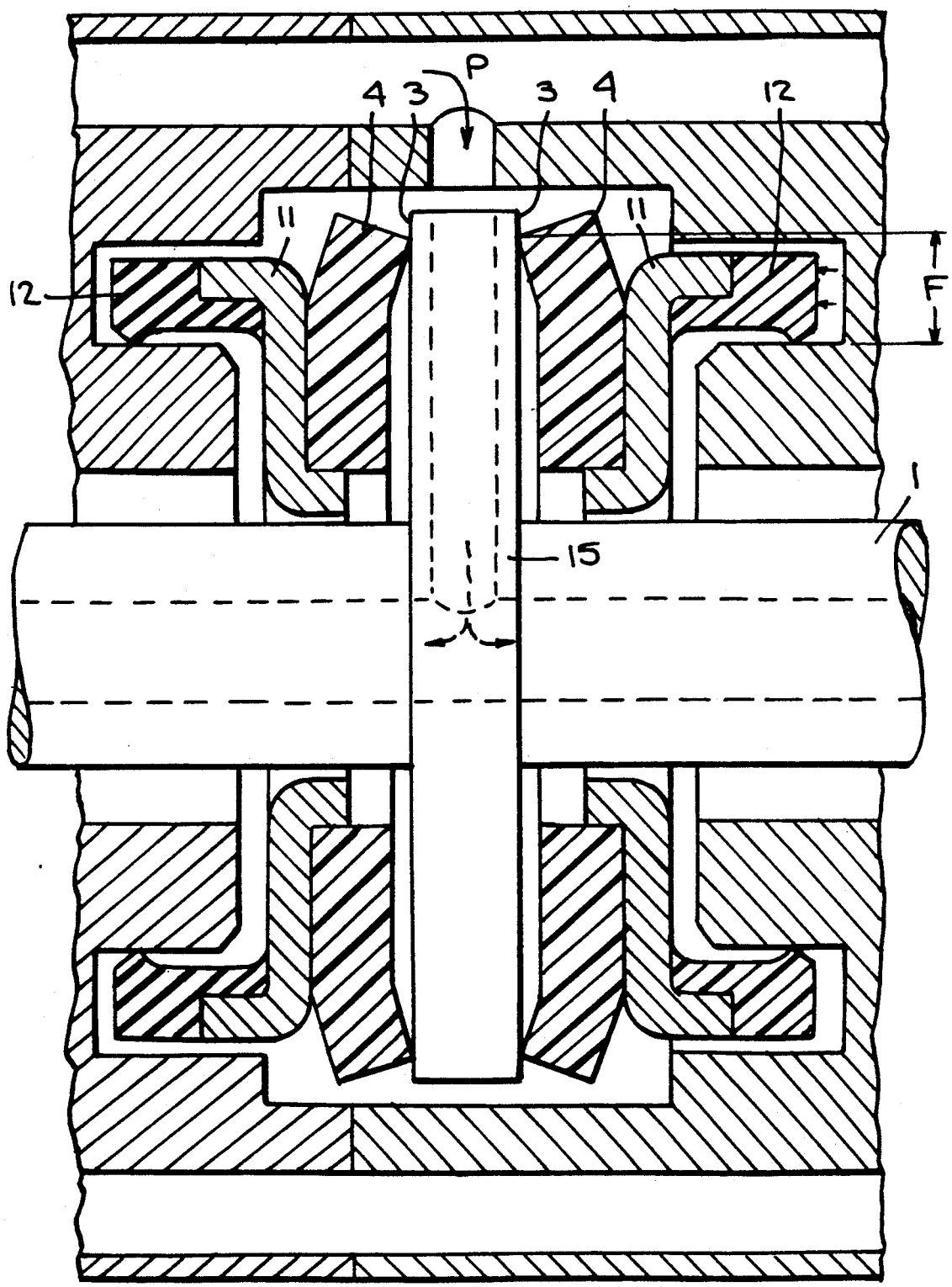
FIG. 2 is a half sectional view of a slide ring seal embodiment wherein the sealing edge is provided at the external circumferential surface of the slide ring.

FIG. 2 represents a slide ring seal which is similar to the above described with regard to function. However, in this case the sealing edge 7 is provided at the external circumference surface of slide ring 4. The rubber-made seal lip 12 which is attached to the intermediate ring 11 by means of vulcanization is correspondingly associated with a cylinder surface 13 comparably smaller in diameter so as to ensure a pressing of sealing edge 7 against the counter surface 3 of the counter ring 15 by means of pressure of the medium to be sealed. An additional slide ring seal is laterally reversed associated with said counter ring 15 on the axially opposing side; this configuration then permits a loss-free transmission of a medium to be sealed from a hollow space of housing in the borehole of a shaft as well as a corresponding transmission in the reverse direction.

Figure 3:
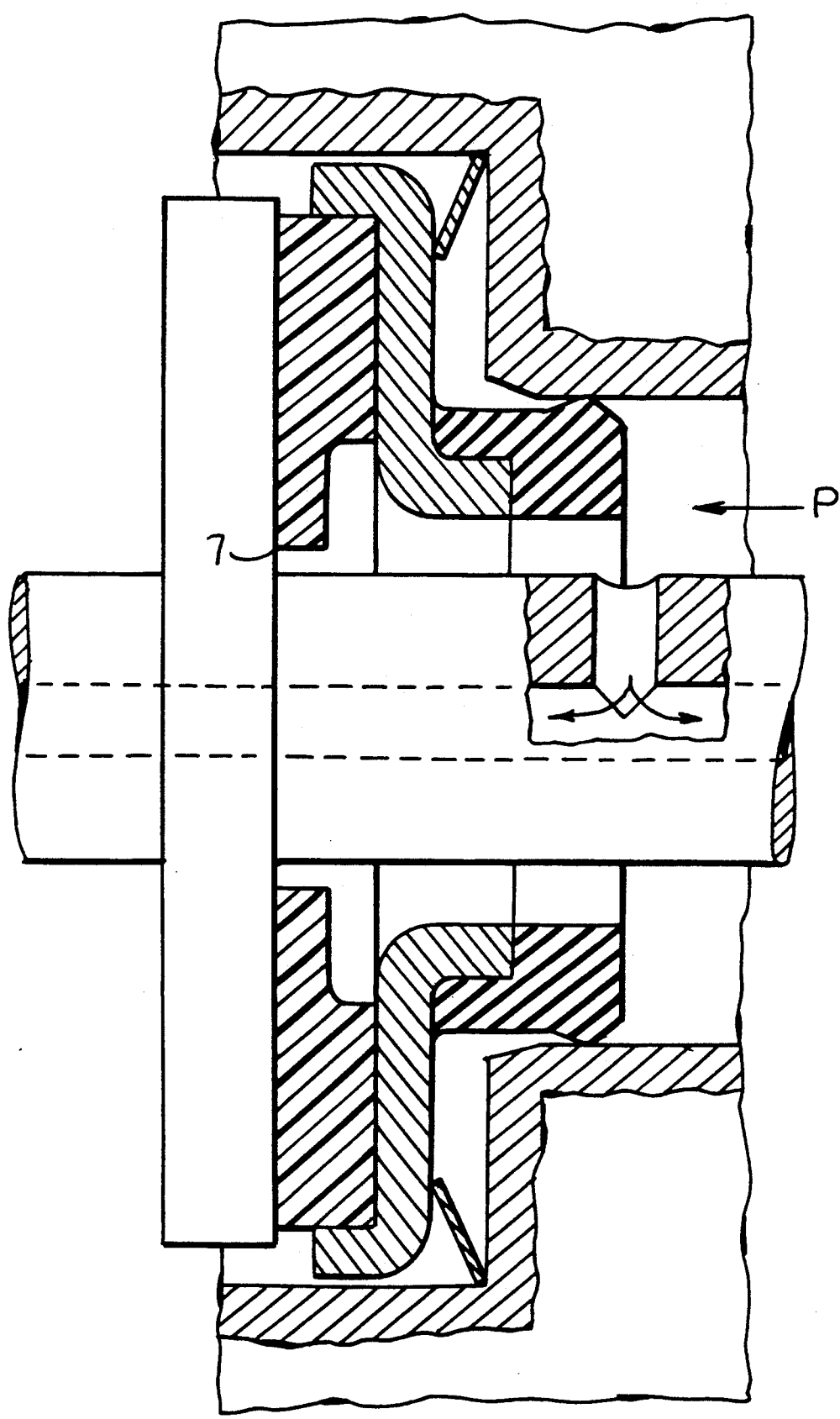
FIG. 3 shows the slide ring seal of FIG. 1 with the sealing edge biassed into full planar contact with the counter surface.

FIG. 3 shows the slide ring seal of FIG. 1 with the seal edge 7 biased into full planar contact by means of the pressure P of the medium to be sealed.

While there have been described what are at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. A slide ring seal to seal about a shaft with respect to a housing, comprising: a slide ring made of polytetrafluorethylene pressed against a counter surface, which is relatively rotatable, by means of pressure of a medium to be sealed and basically extending in a radial direction; said slide ring having an axis and having a cross-sectional profile having a radially external peripheral surface basically extending parallel to the axis of the slide ring, the slide ring having a sealing edge axially extending beyond the profile of a cross section of a major portion of said slide ring towards the counter surface and formed during manufacture, said counter surface including a circumferential surface portion having an outer diameter and said circumferential surface portion being exposed to pressure of the medium to be sealed and the sealing edge having a diameter which is basically identical with the outer diameter of the circumferential surface portion and the sealing edge being resiliently pressable to be basically surface planar with the profile of the cross section of the major portion of said slide ring by means of pressure, the slide ring seal including a cylinder surface of a housing and a support ring having a support surface extending in a radial direction, the slide ring being attached to the support surface of the support ring, the slide ring seal including a sealing lip made of rubber elastic material attached to the support ring, and the sealing lip pressing against the cylinder surface of the housing under elastic pre-stress, the difference between the diameter of the cylinder surface and the diameter of the sealing edge being so small that the effective, specific surface pressure contact at the sealing edge is very low.

2. Slide ring seal in accordance with claim 1, in which the slide ring is provided during manufacture with a recess on a side which is axially opposing the sealing edge.

3. Slide ring seal in accordance with claim 2, in which the recess is defined by a chamfering which is provided at the slide ring during manufacture.

4. Slide ring seal in accordance with claim 1, in which the cylinder surface has a diameter which is such that there is only a partial resilient pressing of the sealing edge into the profile of the cross section of the major portion of the slide ring under regular operating conditions.

5. Slide ring seal in accordance with claim 4, in which the slide ring is elastically pressed against the counter surface and which includes at least one pressure spring provided for said pressing.

6. Slide ring seal in accordance with claim 5, in which the pressure spring is disposed between the support ring and the housing.

* * * * *

UNITED STATES PATENT AND TRADEMARK OFFICE
CERTIFICATE OF CORRECTION

PATENT NO. : 5,018,749
DATED : May 28, 1991
INVENTOR(S) : Hans Forch It is certified that error appears in the above-identified patent and that said Letters Patent is hereby corrected as shown below:

```
Column 3, line 64 for "10" read -- 10 defining the
    sealing edge 7 in direction to the counter ring 15. --.
```

Signed and Sealed this

Second Day of August, 1994

Attest:

BRUCE LEHMAN

*Attesting Officer*    *Commissioner of Patents and Trademarks*